(12) United States Patent
Devilbiss et al.

(10) Patent No.: US 6,777,829 B2
(45) Date of Patent: Aug. 17, 2004

(54) RECTIFIER UTILIZING A GROUNDED ANTENNA

(75) Inventors: Alan D. Devilbiss, Colorado Springs, CO (US); Gary F. Derbenwick, Colorado Springs, CO (US)

(73) Assignee: Celis Semiconductor Corporation, Colorado Springs, CO (US)

( * ) Notice: Subject to any disclaimer, the term of this patent is extended or adjusted under 35 U.S.C. 154(b) by 0 days.

(21) Appl. No.: 10/097,846

(22) Filed: Mar. 13, 2002

(65) Prior Publication Data

US 2003/0184163 A1 Oct. 2, 2003

(51) Int. Cl.$^7$ ................................................. H02J 9/00
(52) U.S. Cl. ..................... 307/151; 340/333; 340/572.1; 340/572.7
(58) Field of Search ........................ 307/151; 340/333, 340/572.7, 572.1

(56) References Cited

U.S. PATENT DOCUMENTS 4,931,788 A * 6/1990 Creswick ............... 340/825.54
6,388,575 B1 * 5/2002 Galloway ................. 340/572.1
6,580,321 B1 * 6/2003 Arell et al. ............... 330/207 P
2002/0097144 A1 * 7/2002 Collins et al. ............. 340/333

* cited by examiner

Primary Examiner—Robert L. DeBeradinis
(74) Attorney, Agent, or Firm—Mark G. Pannell; Hanes & Schutz, P.C.

(57) ABSTRACT

A rectifier generates a rectified output and a dc power output. The rectifier has an antenna element, a tuning capacitor, a coupling capacitor, first and second rectifying diodes, and a storage capacitor. The antenna element and the tuning capacitor are coupled in parallel and grounded at one terminal. The first rectifying diode is grounded at its anode terminal and the storage capacitor is grounded at one terminal. The coupling capacitor is coupled between the ungrounded terminal of the antenna element and the cathode terminal of the first rectifying diode. The anode terminal of the second rectifying diode is coupled to the cathode terminal of the first rectifying diode. The cathode terminal of the second rectifying diode is coupled to the ungrounded terminal of the storage capacitor. The rectified output is generated between the rectifying diodes. The dc power output is generated between the second rectifying diode and the storage capacitor.

43 Claims, 4 Drawing Sheets

RECTIFIER UTILIZING A GROUNDED ANTENNA

FIELD OF THE INVENTION

This invention relates in general to signal rectification, and more particularly, to a rectifier circuit utilizing a grounded antenna.

BACKGROUND OF THE INVENTION

Radio frequency identification (RFID) transponders (tags) are usually used in conjunction with an RFID base station, typically in applications such as inventory control, security, access cards, and personal identification. The base station transmits a carrier signal that powers circuitry in the RFID tag when the RFID tag is brought within a read range of the base station. Data communication between the tag and the station is achieved by modulating the amplitude of the carrier signal with a binary data pattern, usually amplitude shift keying. To that end, RFID tags are typically integrated circuits that include, among other components, antenna elements for coupling the radiated field, rectifiers to convert the AC carrier signal to dc power, and demodulators to extract the data pattern from the envelope of the carrier signal.

If fabricated at sufficiently low cost, RFID tags can also be useful in cost-sensitive applications such as product pricing, baggage tracking, parcel tracking, asset identification, authentication of paper money, and animal identification, to mention just a few application. RFID tags could provide significant advantages over systems conventionally used for such applications, such as bar code identification systems. For example, a basket full of items marked with RFID tags could be read rapidly without having to handle each item, whereas they would have to be handled individually when using a bar code system. Unlike bar codes, RFID tags provide the ability to update information on the tag. However, the RFID technology of today is too expensive for dominant use in such applications. There are several factors that drive up the cost of RFID tags, the most significant of which is the size of the silicon integrated circuit that makes up the tag.

FIG. 1 shows a conventional rectifier utilizing a diode bridge 2. Antenna element 4 requires two connections 6, 8 on opposite sides of diode bridge 2. The rectified signal is output at node 10.

FIG. 2 shows another conventional rectifier utilizing a MOSFET bridge 12. Antenna element 4 also requires two connections 6, 8 on opposite sides of MOSFET bridge 12. In order to accommodate these connections 6, 8, conventional RFID tags require at least two pads large enough to bond wire for the attachment of an external antenna coil 4. Since RFID tag chips are generally relatively small, these pads consume a significant percentage of the integrated circuit area of a conventional RFID tag.

Another concern with conventional RFID tags is the maximum operating reading distance from the base station. In both examples of prior art shown in FIGS. 1 and 2, the rectified output signals at node 10 are only one half the peak-to-peak voltage of the corresponding resonating nodes 6. The amplitudes of the signals on output nodes 10 are related to the maximum operational distance between the RFID tag and the base station.

SUMMARY OF THE INVENTION

According to principles of the present invention, a rectifier generates a rectified output and a dc power output. The rectifier has an antenna element, a tuning capacitor, a coupling capacitor, first and second rectifying diodes, and a storage capacitor. The antenna element and the tuning capacitor are coupled in parallel and grounded at one terminal. The first rectifying diode is grounded at its anode terminal and the storage capacitor is grounded at one terminal. The coupling capacitor is coupled between the ungrounded terminal of the antenna element and the cathode terminal of the first rectifying diode. The anode terminal of the second rectifying diode is coupled to the cathode terminal of the first rectifying diode. The cathode terminal of the second rectifying diode is coupled to the ungrounded terminal of the storage capacitor. The rectified output is generated between the rectifying diodes. The dc power output is generated between the second rectifying diode and the storage capacitor.

According to further principles of the present invention, a diode stack is coupled between the second terminal of the coupling capacitor and ground. The diode stack limits the voltage rectified signal to the breakdown voltage of the diode stack.

DETAILED DESCRIPTION OF THE INVENTION

Figure 1:
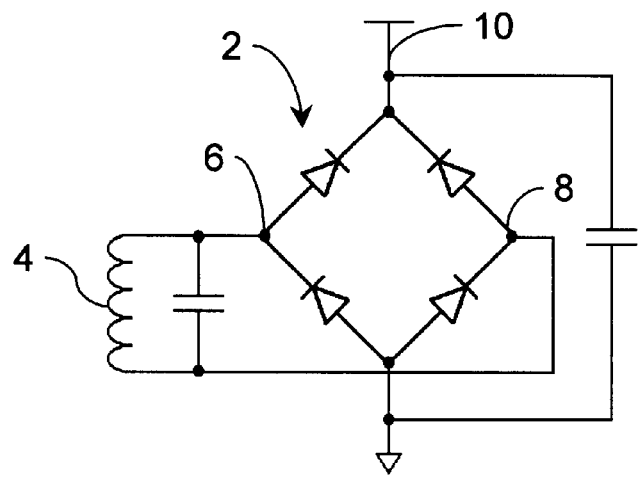
FIG. 1 is a schematic circuit drawing showing prior art design of a conventional rectifier utilizing diodes.
Figure 2:
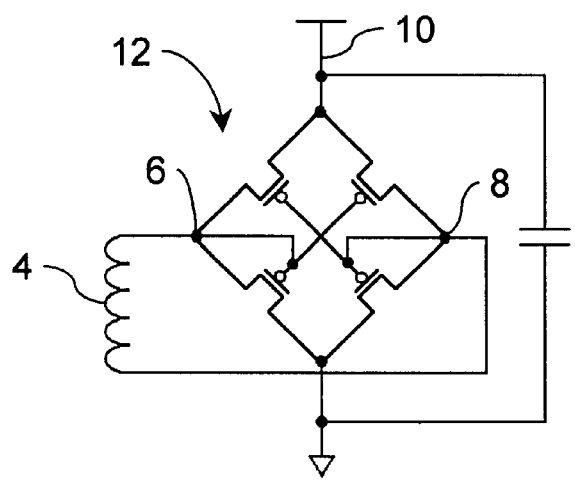
FIG. 2 is a schematic circuit drawing showing prior art design of a conventional rectifier utilizing MOSFETs.
Figure 3:
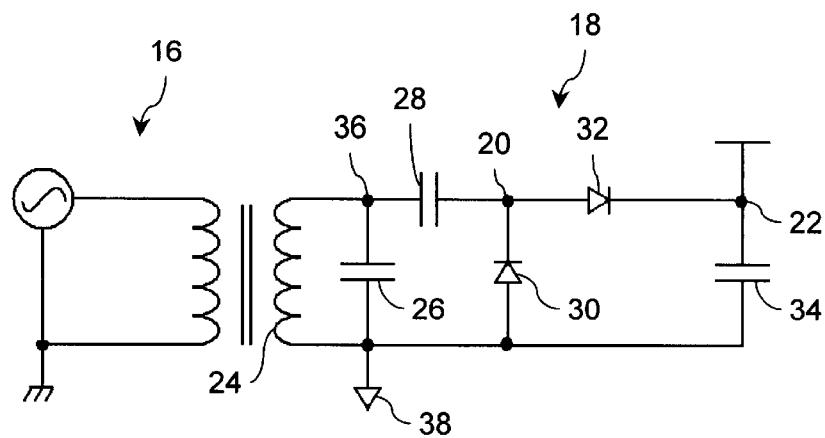
FIG. 3 is a schematic diagram illustrating one embodiment of the present invention.

Illustrated in FIG. 3 are base station 16 and rectifier circuit 18. Base station 16 is included by way of illustration, but is not an integral part of the invention.

In one embodiment, rectifier circuit 18 is embodied at least partially in an integrated circuit chip. Additional circuitry (not shown) may also be embodied in the integrated circuit with rectifier circuit 18. In one embodiment, rectifier circuit 18 is included as a rectifier for a radio frequency identification (RFID) transponder (tag). Other uses for rectifier circuit 18 are possible.

The input of rectifier circuit 18 is a carrier frequency radiated from base station 16 wherein the carrier amplitude is enveloped by a data pattern. One example of a carrier amplitude enveloped by a data pattern is amplitude shift keying. One output of rectifier circuit 18 is rectified output 20, which may be fed into a demodulator (not shown) to extract the envelope signal. Another output of rectifier circuit 18 is power output 22, which may be used as a dc power source. Rectifier circuit 18 includes antenna element 24, tuning capacitor 26, coupling capacitor 28, first rectifying diode 30, second rectifying diode 32, and storage capacitor 34.

In one embodiment antenna element 24 has first and second terminals. The first terminal of antenna element 24 is coupled to a resonating node 36. The second terminal of antenna element 24 is connected to ground 38.

In one embodiment, antenna element 24 is an inductor. Inductor 24 and capacitor 26 are chosen as to resonate the carrier frequency. Inductor 24 is external to the integrated circuit chip in this embodiment, but could also be internal to the integrated circuit. Further, the integrated circuit process could include a high magnetic permeability layer to increase the inductance of the antenna element.

In one embodiment, antenna element 24 is conductive ink printed on paper or other media. In alternative embodiments, antenna element 24 is any other type of inductive element.

Tuning capacitor 26 is connected in parallel with antenna 24 between resonating node 36 and ground 38. In one embodiment, tuning capacitor 26 has first and second terminals. The first terminal of tuning capacitor 26 is connected to the first terminal of antenna 24 and the second terminal of tuning capacitor 26 is connected to the second terminal of antenna 24. When rectifier circuit 18 is brought within reading range of base station 16 radiating the appropriate carrier frequency, the voltage on node 36 will resonate. Capacitor 26 is internal to the integrated circuit in one embodiment, but could also be external to the integrated circuit.

In one embodiment, tuning capacitor 26 is conductive ink printed on paper or other media. In alternative embodiments, tuning capacitor 26 is any other type of capacitive element.

Coupling capacitor 28 is connected to resonating node 36, coupling the voltage to node 20. In one embodiment, coupling capacitor 28 has first and second terminals. The first terminal of coupling capacitor 28 is connected to the first terminal of antenna element 24 and the second terminal of coupling capacitor 28 is connected to first rectifying diode 30 and second rectifying diode 32.

In one embodiment, coupling capacitor 28 is conductive ink printed on paper or other media. In alternative embodiments, coupling capacitor 28 is any other type of capacitive element.

First rectifying diode 30 is coupled between the second terminal of coupling capacitor and ground 38. In one embodiment, first rectifying diode has an anode terminal and a cathode terminal. The anode terminal is connected to ground and the cathode terminal is connected to the second terminal of the coupling capacitor. The rectified output is generated at the cathode terminal.

First rectifying diode 30 will forward-bias when a negative voltage is coupled to node 20, thereby keeping the voltage on node 20 no lower than one diode drop below ground 38. The voltage on node 20 can achieve the same peak-to-peak amplitude as resonating node 36, twice the peak-to-peak amplitude of the rectified output of a conventional rectifier. One skilled in the art can then feed the rectified output at node 20 into a demodulator to extract the binary data pattern that envelops the carrier signal.

Second rectifying diode 32 is connected between the rectified output node 20 and the power output at node 22. In one embodiment, second rectifying diode 32 has an anode terminal and a cathode terminal. The anode is connected to the second terminal of the coupling capacitor and the cathode terminal is connected to storage capacitor 34.

Storage capacitor 34 is coupled between power output node 22 and ground. In one embodiment, storage capacitor 34 has first and second terminals. The first terminal is connected to the cathode terminal of the second rectifying diode and the second terminal is connected to ground.

When the voltage on node 20 is more positive than the voltage on power output node 22, second rectifying diode 32 will forward-bias, thereby charging capacitor 34 to the peak voltage of node 20 less one diode drop. The charge on capacitor 34 may be used as power for other circuitry, and is refreshed at the carrier frequency.

Figure 4:
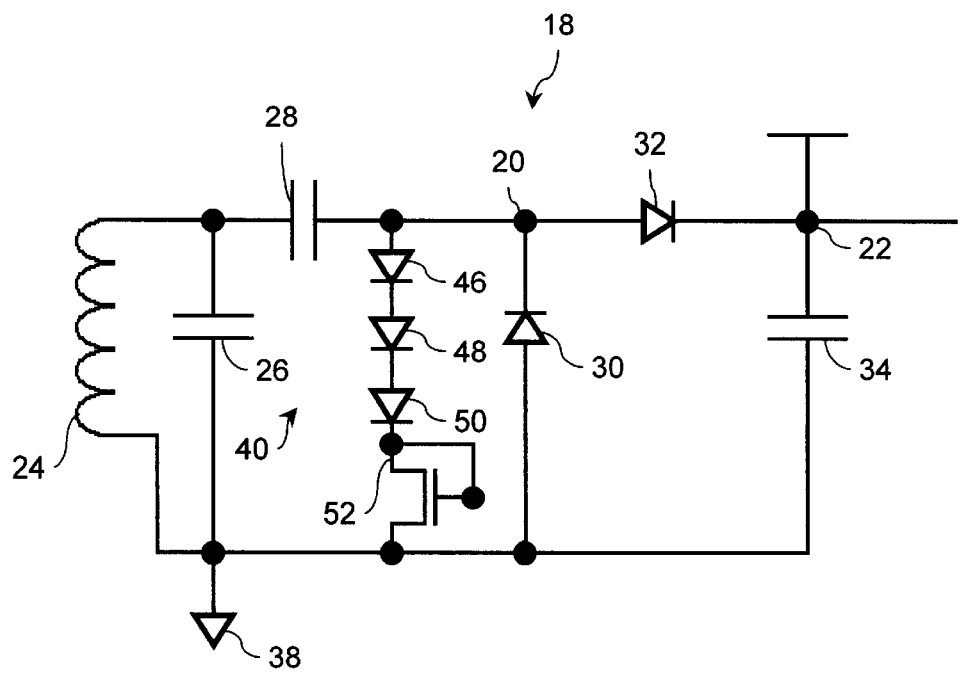
FIG. 4 is a circuit schematic drawing of an alternative embodiment of the present invention.

Depending on the amplitude of the carrier signal, the proximity of rectifier circuit 18 to base station 16, and the coupling efficiency of the radiated field, voltages on resonating node 36 and rectified output node 20 can become sufficiently large as to cause permanent damage to the integrated circuit components. Accordingly, FIG. 4 illustrates an embodiment of the present invention including a diode stack 40 connected between rectified output node 20 and ground 38. Diode stack 40 limits the maximum rectifying voltage. In one embodiment, diode stack 40 includes diodes 46, 48, 50, and MOSFET 52 with the gate connected to the drain.

Figure 5:
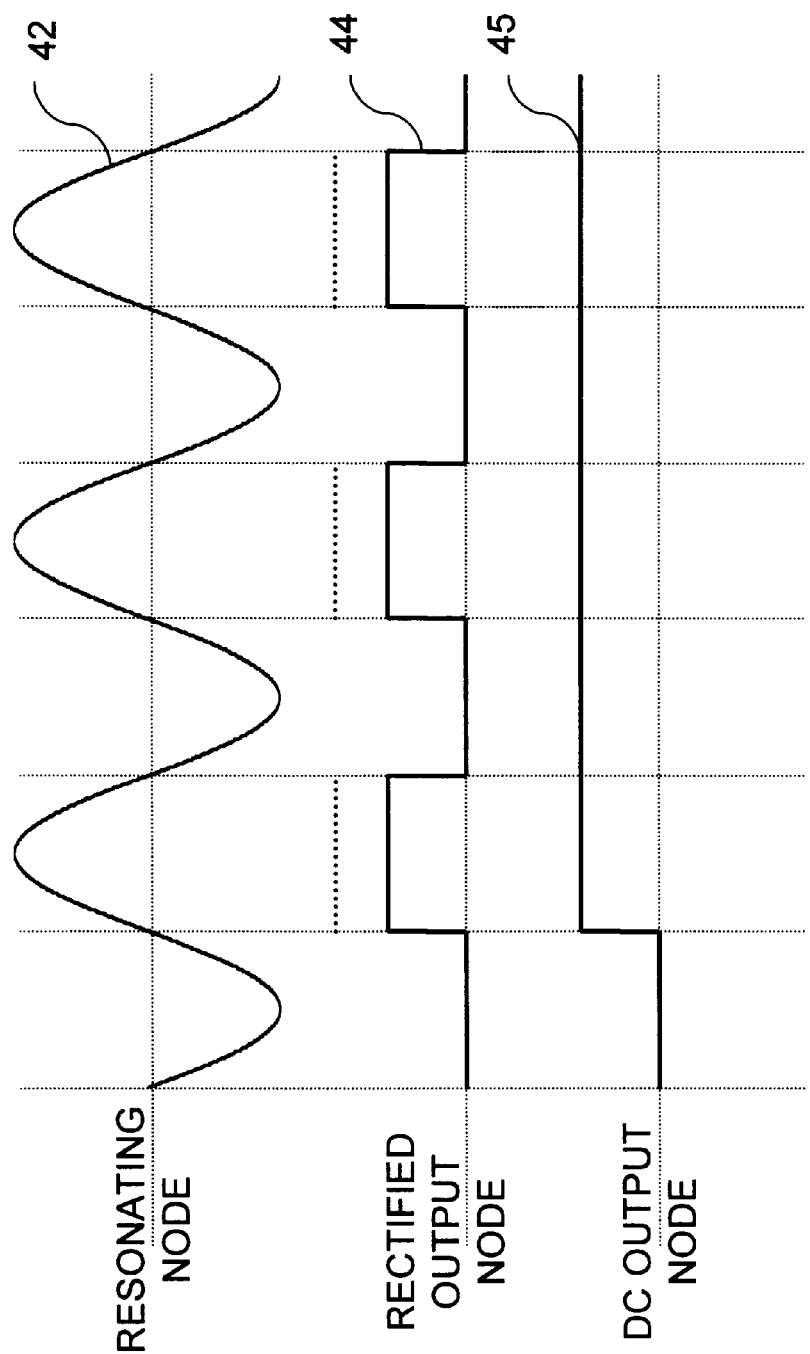
FIG. 5 is a timing diagram of selected nodes in the schematic circuit diagram presented in FIGS. 3 and 4.

FIGS. 3 and 4 are further described with the assistance of FIG. 5, showing the corresponding voltages of some nodes of rectifying circuit 18. When rectifying circuit 18 is brought within read distance of an RFID station 16 radiating the appropriate carrier signal, typically 13.56 Mhz, rectifier 18 will generate dc power on node 22. Other carrier frequencies may also be used. The amplitude of the carrier signal is modulated by a binary bit data pattern, such as ASK or amplitude shift keying, generally at a frequency of 105.9 KHz. The carrier signal may also be modulated at other data frequencies. Node 36 will oscillate with the frequency of the carrier frequency, and will swing both negative and positive. Waveform 42 in FIG. 5 shows the signal on node 36.

Referring again to FIGS. 3 and 4, coupling capacitor 28 will couple this voltage to node 20. Coupling capacitor 28 is internal to the chip in this embodiment, but could be designed to be external as well. However, the signal on node 20 is unable to go more negative than one diode drop below ground 38 due to shunting (rectifying) diode 30. Therefore, when node 36 first swings negative, node 20 will remain one diode drop below ground 38, as shown in waveform 44 in FIG. 5. When the carrier signal on node 36 swings up again, the full peak-to-peak voltage is coupled to node 20. The magnitude of this swing depends on the proximity of rectifying circuit 18 to the modulated carrier source radiating from base station 10. In certain proximity ranges, the voltages generated could be so large as to damage circuit components. For this purpose, the voltage is limited through diode stack 40. When sufficient voltage is generated on node 20, diode stack 40 will conduct, thereby clamping the voltage at a level determined by the breakdown of stack 40.

When the voltage on node 20 is more positive than the voltage on node 22, diode 32 is forward-biased bringing node 22 to the same voltage as node 20. When the voltage on node 20 is less positive than the voltage on node 22, then diode 32 is reverse-biased, causing node 22 to float at the peak voltage of node 20. This charge is stored on storage capacitor 34. The charge on node 22 may be used to supply Vdd power. In one embodiment, the Vdd power may be supplied to the entire chip. Waveform 45 shows the signal on node 22.

As power is supplied from node 22, the charge on node 22 is depleted causing the voltage on node 22 to drop. On the next rising edge of 42, diode 38 will become forward-biased again, when the voltage on node 20 is more positive than on node 22. Through this action, the voltage on node 22 is refreshed to its full voltage on each rising edge of node 20. Accordingly, capacitor 34 must be sufficiently large to supply Vdd current without causing a significant voltage drop on node 22 between carrier pulses.

Figure 6:
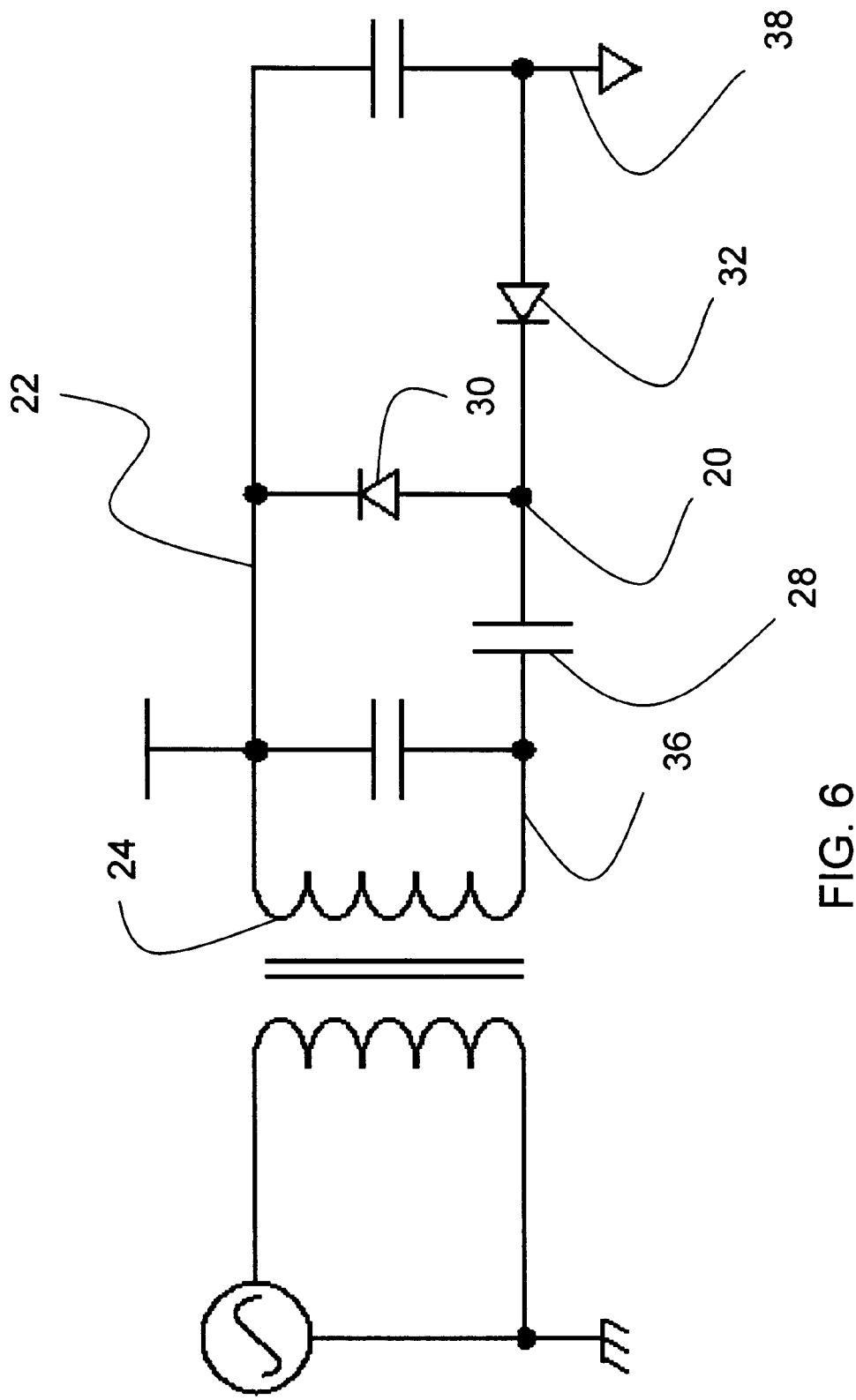
FIG. 6 is a circuit diagram of another embodiment of the present invention.

FIG. 6 is a schematic of another embodiment of the present invention, useful when building the present invention in a semiconductor process wherein the back surface is not coupled to ground, but rather Vdd. In order to gain the advantage of using the back surface as one contact of the antenna, an embodiment is required wherein one terminal of the antenna is connected to the dc power output.

When resonating node 36 goes negative, node 20 is kept more positive than one diode drop above chip ground 38 by rectifying diode 32. When the resonating node 36 goes positive, coupling capacitor 28 couples node 20 high. Rectifying diode 30 turns on, bringing node 22 one diode drop below the peak voltage of node 20. When node 20 is coupled low again by resonating node 36, rectifying diode 30 turns off, thereby trapping charge on node 22. Node 22 represents the dc power output of this circuit. Node 20 represents the rectified output.

Figure 7:
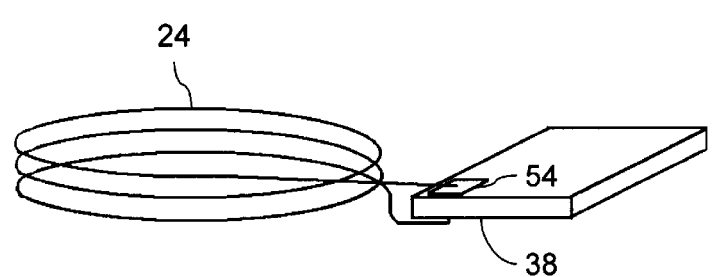
FIG. 7 is a diagram showing one embodiment of an integrated circuit chip and external antenna element of the present invention.

A significant advantage of the rectifier design described herein over conventional designs is that the invention operates using an antenna 24 whereby one of its two terminals is connected to chip ground 38, as shown in FIG. 7. This is a significant advantage since the connection of the external antenna element 24 can now be made by connecting one of the terminals to the back surface 38 of the silicon. The other connection is made on front surface of the silicon to a bonding pad 54. Consequently, only one pad 54 is needed for the connection of the external antenna 24 rather than two pads required in a conventional design. Since the size of a pad is large relative to RFID circuitry, the savings of this pad constitutes a significant savings of silicon area, which translates to a significant reduction in fabrication cost.

Nevertheless, it is also possible to connect the antenna element 24 on two pads on the silicon surface, just as one would connect the antenna 24 when utilizing a conventional rectified design.

A further advantage of having to make only one connection on the top surface of the silicon is that the mechanics of making the connection to the external antenna element 24 is significantly simplified. For example, the connection could be made utilizing a second layer of metal above the integrated circuitry, thereby providing a larger connection surface without increasing silicon area. The larger connection surface enables the use of lower cost connection technologies than wire bonding such as flip chip and conductive epoxy. These bonding technologies are particularly important in bar code replacement applications wherein the antenna consists of printed conductive ink on paper.

Another advantage of this invention is that the rectified signal swings at the full peak-to-peak voltage of the resonant node voltage. The rectified signal in a convention design swings only one half of this amplitude. Consequently, the design described in this invention will enhance the maximum read distance between the RFID tag and the base station 16 while reducing production costs.

The foregoing description is only illustrative of the invention. Various alternatives and modifications can be devised by those skilled in the art without departing from the invention. In particular, wherever a device is connect or coupled to another device, additional devices may be present between the two connected devices. Accordingly, the present invention embraces all such alternatives, modifications, and variances that fall within the scope of the appended claims.

What is claimed is:

1. A rectifier for generating a rectified output and a direct current (dc) power output, the rectifier comprising:
   (a) an antenna element having first and second terminals, the second terminal connected to ground;
   (b) a tuning capacitor coupled between the first terminal of the antenna element and ground;
   (c) a first rectifying diode having a cathode and an anode terminal, the anode terminal connected to ground and the rectified output generated at the cathode terminal;
   (d) a coupling capacitor coupled between the first terminal of the antenna element and the cathode terminal of the first rectifying diode;
   (e) a second rectifying diode having a cathode and an anode terminal, the anode terminal coupled to the cathode terminal of the first rectifying diode and the dc current output generated at the cathode terminal;
   (f) a storage capacitor coupled between the cathode terminal of the second rectifying diode and ground; and
   wherein the first rectifying diode, second rectifying diode, and storage capacitor are embodied on an integrated circuit having a bonding pad and a chip ground, wherein ground includes the chip ground, and wherein the chip ground includes a back surface of the integrated circuit.

2. The rectifier of claim 1 further including a diode stack having a cathode and an anode terminal, the cathode terminal connected to ground and the anode terminal coupled to the second terminal of the coupling capacitor.

3. The rectifier of claim 1 wherein the antenna element, the tuning capacitor, and the coupling capacitor include components constructed with conductive ink printed on print media.

4. The rectifier of claim 1 wherein the integrated circuit includes a high magnetic permeability layer to increase the inductance of the antenna element.

5. The rectifier of claim 1 wherein:
   (a) the tuning capacitor and the coupling capacitor are further embodied on the integrated circuit chip, and
   (b) the antenna element is external to the integrated circuit, the first terminal of the antenna element connected to the bonding pad, and the second terminal of the antenna element connected to the chip ground.

6. The rectifier of claim 1 wherein:
   (a) the coupling capacitor is further embodied on the integrated circuit chip; and
   (b) the antenna element and the tuning capacitor are external to the integrated circuit, the first terminal of the antenna element connected to the bonding pad, and the second terminal of the antenna element connected to the chip ground.

7. The rectifier of claim 1 wherein the antenna element, the tuning capacitor, and the coupling capacitor are external to the integrated circuit, the coupling capacitor coupled between the first terminal of the antenna element and the bonding pad and the second terminal of the antenna element connected to the chip ground.

8. The rectifier of claim 1 wherein the antenna element includes an antenna utilizing conductive ink printed on print media.

9. The rectifier of claim 1 wherein the antenna element and the tuning capacitor include components constructed with conductive ink printed on print media.

10. A rectifier for generating a rectified output comprising:
    (a) an integrated circuit chip comprising an integrated circuit including a bonding pad, a chip ground, and a substrate with the integrated circuit on one surface of the substrate and the chip ground on another surface of the substrate;

(b) an antenna element having a first terminal connected to the bonding pad and a second terminal connected to the chip ground; and (c) the integrated circuit comprising a tuning capacitor connected in parallel with the antenna element, wherein a first node connected to the bonding pad resonates if the antenna element receives a carrier signal frequency, and a rectifier circuit connected to the first node for rectifying the carrier signal at the select frequency to provide the rectified output.

11. The rectifier of claim 10 wherein the antenna element is external to the integrated circuit.

12. A rectifier for generating a rectified output and a direct current (dc) power output, the rectifier comprising:

(a) an antenna element having first and second terminals and an antenna utilizing conductive ink printed on print media, the second terminal connected to ground;

(b) a tuning capacitor having first and second terminals, the first terminal connected to the first terminal of the antenna element and the second terminal connected to ground;

(c) a coupling capacitor having first and second terminals, the first terminal connected to the first terminal of antenna element and the rectified output generated at the second terminal;

(d) a first rectifying diode having a cathode and an anode terminal, the cathode terminal connected to the second terminal of the coupling capacitor and the anode terminal connected to ground;

(e) a second rectifying diode having a cathode and an anode terminal, the anode terminal connected to the second terminal of the coupling capacitor and the dc power output generated at the cathode terminal;

(f) a storage capacitor having first and second terminals, the first terminal connected to the cathode terminal of the second rectifying diode and the second terminal connected to ground; and wherein the first rectifying diode, second rectifying diode, and storage capacitor are embodied on an integrated circuit having a bonding pad and a chip ground and wherein ground includes the chip ground.

13. The rectifier of claim 12 further including a diode stack having a cathode and an anode terminal, the cathode terminal connected to ground and the anode terminal connected to the second terminal of the coupling capacitor.

14. The rectifier of claim 12 wherein the integrated circuit includes a high magnetic permeability layer to increase the inductance of the antenna element.

15. The rectifier of claim 12 wherein the chip ground includes a back surface of the integrated chip.

16. The rectifier of claim 12 wherein:

(a) the tuning capacitor and the coupling capacitor are further embodied on the integrated circuit chip; and (b) the antenna element is external to the integrated circuit, the first terminal of the antenna element connected to the bonding pad, and the second terminal of the antenna element connected to the chip ground.

17. The rectifier of claim 12 wherein:

(a) the coupling capacitor is further embodied on the integrated circuit chip, and (b) the antenna element and the tuning capacitor are external to the integrated circuit, the first terminal of the antenna element and the tuning capacitor connected to the bonding pad and the second terminal of the antenna element and the tuning capacitor connected to the chip ground.

18. The rectifier of claim 12 wherein the antenna element, the tuning capacitor, and the coupling capacitor are external to the integrated circuit, the second terminal of the coupling capacitor connected to the bonding pad and the second terminal of the antenna element connected to the chip ground.

19. The rectifier of claim 12 wherein the tuning capacitor and the coupling capacitor include components constructed with conductive ink printed on print media.

20. The rectifier of claim 12 wherein the tuning capacitor includes a component constructed with conductive ink printed on print media.

21. The rectifier of claim 1 wherein the antenna element, the tuning capacitor, and the coupling capacitor include components constructed with conductive ink printed on print media.

22. The rectifier of claim 1 wherein the integrated circuit includes a high magnetic permeability layer to increase the inductance of the antenna element.

23. A rectifier for generating a rectified output and a direct current (dc) power output the rectifier comprising:

(a) an antenna element having first and second terminals, the second terminal connected to the power output;

(b) a tuning capacitor coupled between the first terminal of the antenna element and the power output;

(c) a first rectifying diode having a cathode and an anode terminal, the cathode terminal connected to the power output and the rectified output generated at the anode terminal;

(d) a coupling capacitor coupled between the first terminal of the antenna element and the anode terminal of the first rectifying diode;

(e) a second rectifying diode having a cathode and an anode terminal, the cathode terminal coupled to the anode terminal of the first rectifying diode and ground;

(f) a storage capacitor coupled between the power output and ground; and wherein the first rectifying diode, second rectifying diode, and storage capacitor are embodied on an integrated circuit having a bonding pad and a power output, wherein power includes the chip power output, and wherein the chip power output includes a back surface of the integrated chip.

24. The rectifier of claim 23 further including a diode stack having a cathode and an anode terminal, the anode terminal connected to the power output and the cathode terminal coupled to the second terminal of the coupling capacitor.

25. The rectifier of claim 23 wherein the antenna element and the tuning capacitor include components constructed with conductive ink printed on print media.

26. The rectifier of claim 23 wherein the antenna element includes an antenna utilizing conductive ink printed on print media.

27. The rectifier of claim 23 wherein:

(a) the tuning capacitor and the coupling capacitor are further embodied on the integrated circuit chip, and (b) the antenna element is external to the integrated circuit, the first terminal of the antenna element connected to the bonding pad, and the second terminal of the antenna element connected to the chip power output.

28. The rectifier of claim 23 wherein:

(a) the coupling capacitor is further embodied on the integrated circuit chip; and (b) the antenna element and the tuning capacitor are external to the integrated circuit, the first terminal of the antenna element connected to the bonding pad, and the second terminal of the antenna element connected to the chip power output.

29. The rectifier of claim 23 wherein the antenna element, the tuning capacitor, and the coupling capacitor are external to the integrated circuit, the coupling capacitor coupled between the first terminal of the antenna element and the bonding pad and the second terminal of the antenna element connected to the chip power output.

30. The rectifier of claim 1 wherein the antenna element, the tuning capacitor, and the coupling capacitor are external to the integrated circuit, the coupling capacitor coupled between the first terminal of the antenna element and the bonding pad and the second terminal of the antenna element connected to the chip power output.

31. The rectifier of claim 1 wherein the tuning capacitor includes a component constructed with conductive ink printed on print media.

32. The rectifier of claim 1 wherein the tuning capacitor and the coupling capacitor include components constructed with conductive ink printed on print media.

33. The rectifier of claim 1 wherein the integrated circuit includes a high magnetic permeability layer to increase the inductance of the antenna element.

34. A rectifier for generating a rectified output and a direct current (dc) power output, the rectifier comprising:
(a) an antenna element having first and second terminals and an antenna utilizing conductive ink printed on print media, the second terminal connected to the power output;
(b) a tuning capacitor having first and second terminals, the first terminal connected to the first terminal of the antenna element and the second terminal connected to the power output;
(c) a coupling capacitor having first and second terminals, the first terminal connected to the first terminal of antenna element and the rectified output generated at the second terminal;
(d) a first rectifying diode having a cathode and an anode terminal, the anode terminal connected to the second terminal of the coupling capacitor and the cathode terminal connected to power output;
(e) a second rectifying diode having a cathode and an anode terminal, the cathode terminal connected to the second terminal of the coupling capacitor and the anode terminal coupled to ground;
(f) a storage capacitor coupled between the power output and ground; and
wherein the first rectifying diode, second rectifying diode, and storage capacitor are embodied on an integrated circuit having a bonding pad and a power output, and wherein power includes the chip power output.

35. The rectifier of claim 34 further including a diode stack having a cathode and an anode terminal, the anode terminal connected to the power output and the cathode terminal coupled to the second terminal of the coupling capacitor.

36. The rectifier of claim 34 wherein:
(a) the coupling capacitor is further embodied on the integrated circuit chip; and
(b) the antenna element and the tuning capacitor are external to the integrated circuit, the first terminal of the antenna element connected to the bonding pad, and the second terminal of the antenna element connected to the chip power output.

37. The rectifier of claim 34 wherein the chip power output includes a back surface of the integrated chip.

38. The rectifier of claim 34 wherein:
(a) the tuning capacitor and the coupling capacitor are further embodied on the integrated circuit chip, and
(b) the antenna element is external to the integrated circuit, the first terminal of the antenna element connected to the bonding pad, and the second terminal of the antenna element connected to the chip power output.

39. A rectifier for generating a rectified output comprising:
(a) an antenna element connected between a first node and ground;
(b) a tuning capacitor connected in parallel with the antenna element, wherein the first node resonates if the antenna element receives a carrier signal at a select frequency; and
(c) a rectifier circuit connected to the first node and to ground for rectifying the carrier signal at the select frequency to provide the rectified output; wherein the rectifier circuit is embodied on an integrated circuit having a chip ground and a substrate with the rectifier circuit on one surface of the substrate and the chip ground on another surface of the substrate and wherein ground includes the chip ground.

40. The rectifier of claim 39 wherein the rectifier circuit comprises a rectifier diode.

41. The rectifier of claim 40 wherein the rectifier circuit comprises a coupling capacitor connecting the rectifier diode to the first node.

42. The rectifier of claim 39 further comprising a power output circuit connected to the rectifier circuit for developing dc power output.

43. The rectifier of claim 39 wherein the antenna element is external to the integrated circuit.

* * * * *